(12) United States Patent
Hawtof et al.

(10) Patent No.: US 8,137,469 B2
(45) Date of Patent: Mar. 20, 2012

(54) METHOD AND APPARATUS FOR MAKING FUSED SILICA

(75) Inventors: Daniel Warren Hawtof, Corning, NY (US); Michael T Kelley, Horseheads, NY (US); John Stephen Rosettie, Corning, NY (US); Andrew Paul Schermerhorn, Painted Post, NY (US); Kashyap H Shah, Painted Post, NY (US); John Stone, III, Painted Post, NY (US); Pushkar Tandon, Corning, NY (US)

(73) Assignee: Corning Incorporated, Corning, NY (US)

( * ) Notice: Subject to any disclaimer, the term of this patent is extended or adjusted under 35 U.S.C. 154(b) by 937 days.

(21) Appl. No.: 11/305,857

(22) Filed: Dec. 14, 2005

(65) Prior Publication Data

US 2007/0130995 A1 Jun. 14, 2007

(51) Int. Cl.
*C03B 37/018* (2006.01)

(52) U.S. Cl. .......................... 118/725; 65/413

(58) Field of Classification Search .............. 65/376, 65/483, 385, 414, 413, 377, 507, 509, 17.4, 65/386, 29.19, 531
See application file for complete search history.

(56) References Cited

U.S. PATENT DOCUMENTS

| | | | | |
|---|---|---|---|---|
| 5,059,770 A | * | 10/1991 | Mahawili | 219/391 |
| 5,676,725 A | * | 10/1997 | Ito et al. | 65/382 |
| 6,153,012 A | * | 11/2000 | Rupp et al. | 118/715 |
| 6,328,807 B1 | * | 12/2001 | Boek et al. | 118/724 |
| 6,497,118 B1 | * | 12/2002 | Schermerhorn | 65/17.4 |
| 6,606,883 B2 | * | 8/2003 | Hrdina et al. | 65/17.4 |
| 6,698,248 B2 | * | 3/2004 | Marley et al. | 65/413 |
| 2005/0155388 A1 | * | 7/2005 | Burke et al. | 65/392 |

* cited by examiner

*Primary Examiner* — Matthew Daniel
*Assistant Examiner* — Yana Belyaev
(74) *Attorney, Agent, or Firm* — Robert P. Santandrea; Siwen Chen

(57) ABSTRACT

Disclosed are process and apparatus for making high purity fused silica glass materials. The process involves depositing soot particles onto an essentially planar deposition supporting surface and modulation of motion of the soot-generating device relative to the deposition supporting surface to result in a low local soot density variation. The apparatus is designed to implement the planar deposition process. The invention makes it possible to produce fused silica glass without the use of potentially contaminating refractory bricks.

59 Claims, 9 Drawing Sheets

US 8,137,469 B2

METHOD AND APPARATUS FOR MAKING FUSED SILICA

FIELD OF THE INVENTION

The present invention relates to process and apparatus for making doped or pure synthetic silica glass material. In particular, the present invention relates to process and apparatus for making doped or pure silica glass material involving planar deposition. The present invention is useful, for example, in making high purity and doped fused silica glass material for use as optical members in various applications, such as UV lithography devices.

BACKGROUND OF THE INVENTION

High purity or doped fused silica glass materials have found use in many modern optical systems. For example, state-of-the-art lithography devices in the semiconductor industry, especially those operating at deep UV and vacuum UV wavelengths, typically have refractive or reflective optical elements made from or based on high purity or doped fused silica glass materials. The high precision and resolution required for modern lithography devices in the production of very large scale integrated circuits has pushed the lithographic radiation to shorter wavelength, thus higher energy. The optical elements used in these systems are required to have high performance in many aspects, such as transmission, transmission degradation, birefringence, refractive index homogeneity, laser-induced wavefront distortion (LIWFD), thermal expansion coefficient uniformity, and the like.

Doped and undoped Synthetic silica glass materials have also been used in the manufacture of optical fibers.

Two types of processes for making synthetic silica materials have been developed and commercialized to date. They are the direct-to-glass process and soot-to-glass process. In the former, glass soot particles are provided by, e.g., flame hydrolysis of a silicon-containing precursor material and optional dopants, deposited on a supporting surface and sintered in situ into transparent glass. In a soot-to-glass process, a glass soot preform is first formed from the glass soot particles, then optionally dried, purified and/or doped, before it is sintered into dense glass in a separate step. Various soot deposition techniques have been developed, such as outside vapor deposition (OVD), inside vapor deposition (IVD) and vapor axial deposition (VAD), and the like. All these processes were initially designed for making waveguide preforms. Because of the deposition techniques used, undesired property inhomogeneity in the sintered glass tend to exist, and post-sintering reforming of the glass are invariably required in order to produce the glass meeting the requirements of modern UV lithography.

U.S. Pat. No. 6,606,883 discloses soot-to-glass process for making doped and un-doped silica glass in which soot particles are deposited on a planar surface. However, the teaching in this reference of the process and apparatus is limited, especially with regard to the soot density variation of the soot preform produced therein. Moreover, the examples in this patent reference involve the use of refractory bricks in constructing the furnace, which are potential contaminant sources.

The present invention is an improvement over the process and apparatus described in U.S. Pat. No. 6,606,883.

SUMMARY OF THE INVENTION

Thus, according to a first aspect of the present invention, it is provided a process for making doped or undoped silica glass material, comprising the following steps:

(I) providing at least one stream of glass soot particles comprising silica via a soot-generating device; and (II) directing the least one stream of glass soot particles to an essentially planar deposition supporting surface of a deposition substrate rotating about a rotation axis, such that at least one layer of glass soot is deposited on the deposition supporting surface to form a soot preform, said layer having an area $A_1$ and a thickness $T_1$;

wherein in step (II), the soot-generating device is allowed to move relative to the deposition supporting surface, and the velocity of the soot-generating device relative to the deposition supporting surface is modulated such that in at least half of the area of the layer of glass soot deposited, local soot density variation through at least the center half thickness is low. In certain preferred embodiments, variation of average local soot density through the center half thickness is less than 10%, preferably less than 5%, more preferably less than 3% of the average local soot density in that area. Preferably, in certain embodiments, in step (II), the velocity of the soot-generating device relative to the deposition supporting surface is modulated such that in at least 75% of the area of the layer of glass soot deposited, local soot density variation through 90% of the thickness from the bottom in proximity to the deposition supporting surface is low. In certain preferred embodiments, the variation of average local soot density through 90% of the thickness from the bottom in proximity to the deposition supporting surface is less than 10%, preferably less than 5%, more preferably less than 3% of the average local soot density in that area. In certain embodiments, it is preferred that the deposition supporting surface of the deposition substrate is essentially horizontal, and the rotation axis of the deposition substrate is essentially vertical. In certain embodiments, the deposition supporting surface of the deposition substrate faces upward. In certain other embodiments, the deposition supporting surface of the deposition substrate faces downward.

In certain preferred embodiments of the process of the present invention, in step (III), the velocity of the soot-generating device relative to the deposition supporting surface is modulated such that in at least half of the area of the layer of glass soot deposited and through at least the center half thickness, the soot preform exhibits a high OH concentration uniformity (as defined below).

In one embodiment of the process of the present invention, the soot-generating device is a single burner. In certain embodiments, the single burner is allowed to oscillate relative to the deposition supporting surface across the rotation axis. In certain other embodiments, the soot-generating device is a burner array comprising at least two burners. In certain preferred embodiment of the process of the present invention, at least one edge burner is provided.

Preferably, in step (II) in the process of the present invention, the deposition supporting surface is actively heated to a temperature between 500-1000° C., in certain embodiments preferably 700-1000° C. Preferably, the deposition supporting surface has an essentially uniform temperature, preferably a temperature variation of less than or equal to about 50° C., in certain embodiments less than or equal to about 25° C., in certain embodiments preferably less than or equal to about 15° C., in certain other embodiments preferably less than or equal to about 10° C., excluding areas directly in contact with the soot stream from the soot-generating device.

Preferably, the process of the present invention further comprises the following steps:

(III) optionally drying, purifying and/or doping the soot preform formed in step (II); and (IV) sintering at least part of the soot preform at a temperature over 1000° C. to obtain a sintered glass essentially free of bubbles.

In certain preferred embodiments, step (III) is carried out in which the soot preform is doped in an atmosphere comprising dopants, and the soot preform is maintained between about 700° C. and 1400° C. In certain preferred embodiments, at any given time during step (III), the soot preform has an average temperature $T_a$, and the temperature throughout the soot preform is maintained within $T_a \pm 50°$ C., in certain embodiments preferably within $T_a \pm 25°$ C., in certain embodiments preferably within $T_a \pm 10°$ C., in certain other embodiments preferably within $T_a \pm 5°$ C. In certain preferred embodiments, during step (III), the soot preform is placed upon a supporting surface of an essentially uniformly actively heated supporting doping stage. In certain preferred embodiments of the process of the present invention, the supporting surface of the essentially uniformly actively heated supporting doping stage has a temperature variation of less than or equal to about 100° C., in certain embodiments preferably less than or equal to about 50° C., in certain embodiments preferably less than or equal to about 20° C., in certain other embodiments preferably less than or equal to about 10° C., in certain other embodiments preferably less than or equal to about 5° C. In certain preferred embodiments of the process of the present invention, in step (IV), the soot preform is allowed to sinter over an actively heated sintering substrate having a supporting sintering surface with an essentially uniform temperature upon which the soot preform is placed, whereby the sintering of the soot preform is allowed to progress from the surface in contact with the supporting sintering surface to the other end. In certain preferred embodiments, in step (IV), at any given time, different areas of the sintering front progresses at an essentially uniform speed. In one preferred embodiment, during step (IV), the sintering front progresses at an essentially constant speed. In certain preferred embodiments, the deposition substrate and the sintering substrate are the same substrate. In certain preferred embodiments, the deposition substrate is made of high purity fused silica glass. In certain preferred embodiments, the supporting sintering surface is heated to a temperature between 1000-1500° C., whereby sintering is allowed to occur. In certain preferred embodiments, at any given time, the supporting sintering surface has a temperature variation of less than or equal to about 100° C., in certain embodiments less than or equal to about 50° C., in certain embodiments less than or equal to about 20° C., in certain other embodiments less than or equal to about 10° C., in certain other embodiments preferably less than or equal to about 5° C. In certain preferred embodiments, at any given time during step (IV), the soot preform has an average temperature $T_b$, and the temperature throughout the soot preform is maintained within $T_b \pm 50°$ C., in certain embodiments preferably within $T_b \pm 25°$ C., in certain embodiments preferably within $T_b \pm 10°$ C., in certain other embodiments preferably within $T_b \pm 5°$ C. In certain preferred embodiments, step (IV) is carried out in air. In certain preferred embodiments, step (IV) is carried out in an atmosphere the partial pressure of water or other OH-imparting agent in which is controlled, so that the OH concentration in the sintered glass is controlled. In certain other preferred embodiments, step (IV) is carried out in the presence of dopants. In certain preferred embodiments, steps (III) and (IV) are both carried out, and are carried out at least partly concurrently.

In certain preferred embodiments of the process of the present invention, the steps (I) and (II) are carried out in an environment essentially free of contaminating refractories.

Preferably, steps (III) and (IV), if carried out, are carried out in an environment essentially free of contaminating refractories as well.

A second aspect of the present invention is a process for making doped or undoped silica glass material, comprising the following steps:

(I) providing at least one stream of glass soot particles comprising silica via a soot-generating device; and (II) directing the at least one stream of glass soot particles to an essentially planar deposition supporting surface of a deposition substrate rotatable about a rotation axis, such that at least one layer of glass soot is deposited on the deposition supporting surface to form a soot preform, said layer comprising a cylinder having a diameter of at least 5 cm and a height of at least 5 mm;

wherein in step (II), the soot-generating device is allowed to move relative to the deposition supporting surface, and the velocity of the soot-generating device relative to the deposition supporting surface is modulated such that in the identified cylinder, local soot density variation measured in a plane parallel to the bottom surface of the cylinder is low. In certain embodiments, the identified cylinder having a low local soot density variation has a diameter of at least 10 cm. In certain embodiments, the identified cylinder having a low local soot density variation has a diameter of at least 10 cm and a height of at least 5 cm. In certain embodiments, in step (II), the velocity of the soot-generating device relative to the deposition supporting surface is modulated such that in the identified cylinder, the soot preform exhibits a high OH concentration uniformity.

A third aspect of the present invention is an apparatus for making silica glass material from soot particles, comprising the following components:

(A) a soot deposition substrate having an essentially planar deposition supporting surface on which soot particles are to be deposited and capable of rotating about a rotation axis;

(B) an active heating source having controllable heating power for heating the soot deposition substrate such that the deposition supporting surface has an essentially uniform temperature;

(C) a glass soot-generating device (i) capable of providing at least one stream of glass soot particles and directing the stream of glass soot particles to the deposition supporting surface of the soot deposition substrate and (ii) movable horizontally and/or vertically relative to the deposition supporting surface of the soot deposition substrate; and (D) a system for controlling and driving the motion of the soot-generating device relative to the deposition supporting surface of the soot deposition substrate.

In certain preferred embodiments of the apparatus of the present invention, the heating source of component (B) is essentially planar.

In certain preferred embodiments of the apparatus of the present invention, the planar deposition supporting surface of component (A) is placed essentially horizontally, and the rotation axis of the soot deposition substrate is essentially vertical.

In certain preferred embodiments of the apparatus of the present invention, the apparatus is essentially free of contaminating refractories in area exposed to the atmosphere in which the soot deposition takes place.

In certain preferred embodiments of the apparatus of the present invention, the component (D) is capable of modulating the velocity of the soot-generating device relative to the deposition supporting surface of the soot deposition substrate such that at least one layer of glass soot can be deposited on the deposition supporting surface to form a soot preform comprising a layer of soot particles, said layer of soot particles comprising a cylinder having a diameter of at least 5 cm and a height of at least 5 mm, wherein in the identified cylinder, local soot density variation measured in a plane parallel to the bottom surface of the cylinder is low. In certain preferred embodiments, the layer of soot particles comprises a cylinder having a diameter of at least 10 cm and a height of at least 5 mm wherein in the identified cylinder, local soot density variation measured in a plane parallel to the bottom surface of the cylinder is low. In certain preferred embodiments, the layer of soot particles comprises a cylinder having a diameter of at least 10 cm and a height of at least 5 cm wherein in the identified cylinder, local soot density variation measured in a plane parallel to the bottom surface of the cylinder is low.

In certain preferred embodiments of the apparatus of the present invention, the component (D) is capable of modulating the velocity of the soot-generating device relative to the deposition supporting surface of the soot deposition substrate such that at least one layer of glass soot can be deposited on the deposition supporting surface, wherein in at least half of the area of the at least one layer of glass soot deposited, local soot density variation through at least the center half thickness is low. In certain preferred embodiments, the variation of average local soot density through the center half thickness is less than 10%, preferably less than 5%, more preferably less than 3% of the average local soot density in that area. In certain preferred embodiments of the apparatus of the present invention, the component (D) is capable of modulating the velocity of the soot-generating device relative to the deposition supporting surface of the soot deposition substrate such that at least one layer of glass soot can be deposited on the deposition supporting surface, wherein in at least 75% of the area of the at least one layer of glass soot deposited, local soot density variation through 90% of the thickness from the bottom in proximity to the deposition supporting surface is low. In certain preferred embodiments, in at least 75% of the area of the at least one layer of glass soot deposited, local soot density variation through 90% of the thickness from the bottom in proximity to the deposition supporting surface is less than 10%, preferably less than 5%, more preferably less than 3% of the average local soot density in that area.

In a preferred embodiment of the apparatus of the present invention, the component (B) is a planar succeptor of an induction heating system. In one embodiment, the planar succeptor is made of graphite.

In certain preferred embodiments of the apparatus of the present invention, the component (A) comprises at least one burner. In certain preferred embodiments, the component (A) comprises multiple burners. In certain preferred embodiments, at least one burner of the multiple burners provides dopant soot particles, and at least one burner provides silica soot particles. In one embodiment, at least one burner provides $TiO_2$ soot particles. In certain embodiments of the apparatus of the present invention, the component (C) is a single burner capable of oscillating across the rotation axis of the deposition supporting surface. In certain embodiments of the apparatus of the present invention, at least one edge burner is provided.

In certain preferred embodiment of the apparatus of the present invention, the component (B) is capable of heating the component (A) to a temperature to enable a glass soot preform consisting essentially of silica particles and/or dopant particles placed atop the deposition supporting surface to sinter progressively.

In one embodiment of the apparatus of the present invention, it further comprises an enclosure adapted for covering a glass soot preform to form a chamber, said enclosure optionally equipped with inlets through which gas can be introduced into the chamber. In certain embodiments it is preferred that the enclosure is made of fused silica glass.

In one embodiment of the apparatus of the present invention, the soot deposition substrate is made of high purity fused silica glass.

In one preferred embodiment of the apparatus of the present invention, the component (B) is rotatable about an essentially vertical rotation axis of the deposition substrate.

In one preferred embodiment of the apparatus of the present invention, the component (B) is placed upon the surface of a rotatable stage, and the component (B) and the rotatable stage are separated by a layer of refractory felt.

In one embodiment of the apparatus of the present invention, it further comprises the following component:

(E) a control unit in communication with the components (A), (B), (C) and (D), adapted for collecting operation information of components (A), (B), (C) and (D), and adjusting the parameters thereof accordingly where needed in order to obtain a predetermined soot deposition, doping and/or sintering condition.

The present invention has the advantage of being capable of producing high purity sintered fused silica glass with ease. The soot preform produced by the process and apparatus of the present invention can be sintered into transparent glass in the apparatus of the present invention with desired physical properties without the need of further thermal reflow or homogenization.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION OF THE INVENTION

Figure 1:
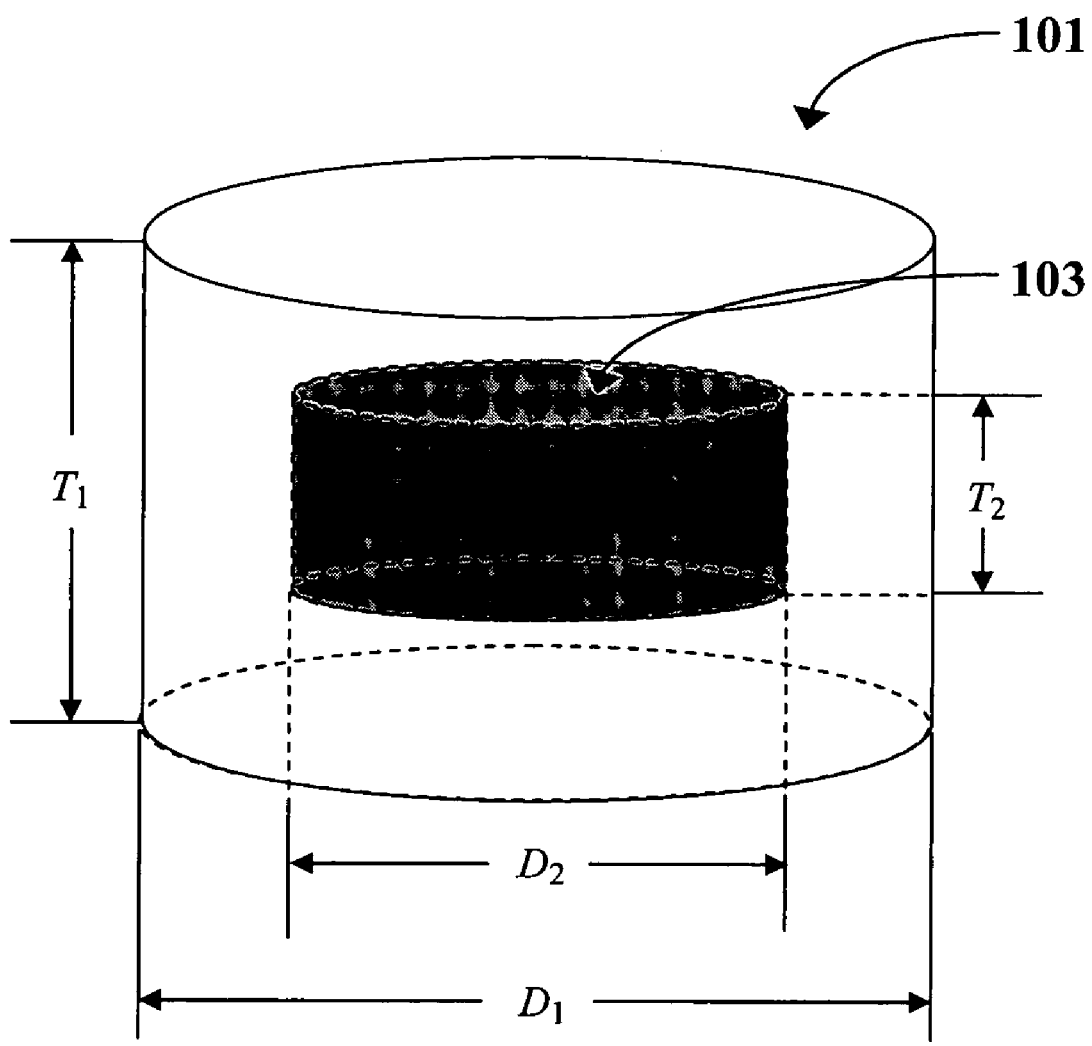
FIG. 1 is a schematic diagram illustrating a soot preform produced by using the process and apparatus of the present invention.

As used herein, the term "burner" means a soot-generating device where soot particles are generated by flame hydrolysis process of precursor compounds. For example, an exemplary burner in the production of silica glass via flame hydrolysis comprises holes through which silicon-containing precursor compounds, such as OMCTS (octamethylcyclotetrasiloxane) are introduced into a burner flame of $H_2$, $CH_4$ or other fuels. OMCTS is oxidized and hydrolyzed in the flame to produce fine silica soot particles. Burners typically involve chemical reactions of the precursor compounds at an elevated temperature. U.S. Pat. No. 6,606,883 describes burners for use in the production of doped and un-doped fused silica glasses, the relevant parts thereof are incorporated herein in their entirety. U.S. Pat. No. 5,922,100 to Cain et al. discloses examples of premixed, natural gas burners that may be used in the present invention, the relevant parts thereof are incorporated herein by reference. However, the burners that may be used in the present invention are not restricted to those described in U.S. Pat. Nos. 5,922,100 and 6,606,833. Burners mentioned in U.S. Pat. Nos. 6,837,076, 6,743,011, 6,736,633 may be used as well in the present invention.

As used herein, the term "low local soot density variation" means that the soot preform deposited, or the layer of soot particles deposited, has, over a distance over 0.2 mm, preferably over a distance over 0.2 cm, an initial local soot density variation measured in a plane perpendicular to the intended optical axis of the sintered glass of less than 20% of the average bulk density of the soot preform, or less than 0.2 $g/cm^3$, whichever is greater. Preferably, the soot preform or soot particle layer deposited by using the process or apparatus of the present invention has, over a distance over 0.2 mm, more preferably over 0.2 cm, an initial local soot density variation measured in a plane perpendicular to the intended optical axis of the sintered glass of less than 10% of the average bulk density of the soot preform, or less than 0.1 $g/cm^3$, whichever is greater. In the present invention, "local soot density" at a given location in an identified area with certain given thickness is the average of measured local soot density throughout the thickness at the given location.

As used herein, the term "high OH concentration uniformity" means that the soot preform deposited, or the layer of soot particles deposited, has, over a distance over 0.2 mm, preferably over a distance over 0.2 cm, as measured in a plane perpendicular to the intended optical axis of the sintered glass, an average OH concentration $C_1$ (expressed in terms of ppm by weight), and measured OH concentrations within the range of $C_1 \pm 50$ ppm, preferably within the range of $C_1 \pm 25$ ppm. In the present invention, "OH Concentration" at a given location in an identified area with certain given thickness is the average of measured local soot density throughout the thickness at the given location.

The term "essentially planar" means that the surface involved is part of a flat plane or curved plane. Thus the surface may be flat or contoured, and may take various shapes such as, but not limited to, circular, rectangular, convexly domed, or concavely domed.

As used herein, the term "contaminating refractories" means refractory materials such as but not limited to zircon, $ZrO_2$, $Al_2O_3$, and the like, typically used for constructing high-temperature furnaces and exposed to the environment in which the glass is to be produced, which contain elements detrimental to the silica glass to be produced and susceptible to migrating to the silica glass under the process conditions.

As used herein, the term "active heating" means that the heating is effected at least partly by energy provided from heating devices other than the soot-generating device. Thus, additional heating devices, such as electrical resistive heating, induction heating, and the like, may be employed to effect active heating. Thus, "actively heated" means being subjected to active heating.

The term "essentially uniform temperature" means that the temperature of the surface or object concerned has an average temperature $T_m$, and the temperature at different locations of the surface or object lies in the range of $T_m \pm 50°$ C. The average temperature $T_m$ may vary over time. In certain preferred embodiments, the temperature at different locations of the surface or object lies in the range of $T_m \pm 25°$ C. In certain other preferred embodiments, the temperature at different locations of the surface of object lies in the range of $T_m \pm 10°$ C.

The present invention relates to the production of fused silica glass by using a soot-to-glass process having a planar deposition step in which silica soot particles are deposited onto an essentially planar deposition supporting surface. As mentioned supra, the present invention is an improvement over U.S. Pat. No. 6,606,883, the relevant parts thereof are incorporated herein by reference in their entirety.

The first step of the process of the present invention involves providing at least one stream of soot particles comprising silica via a soot-generating device. The soot particles may be an admixture of soot particles having different compositions, or soot particles with essentially the same composition. Thus the soot particles may be silica soot particles doped with various dopants, or a mixture of silica soot particles and dopant soot particles such as $TiO_2$, $Al_2O_3$, and the like. The soot-generating device may comprise one burner, multiple burners, plasma guns and other soot guns. The soot particles may be formed via flame hydrolysis, such as in the cases of burners, or pre-formed and fed into the soot-generating devices. Such pre-formed soot particles may be formed by, for example, flame hydrolysis, sol-gel, or other processes. U.S. Pat. No. 6,606,883 describes the flame hydrolysis (or thermal decomposition) of silicon-containing and Ti-containing precursors, the relevant parts thereof are incorporated herein by reference. The soot-generating process, with a burner or not, may be plasma-assisted.

In the second step of the process of the present invention, the at least one stream of glass soot particles are directed to an essentially planar deposition supporting surface of a deposition substrate rotatable about a rotation axis, such that at least one layer of glass soot is deposited on the deposition supporting surface to form a soot preform, said layer having an area $A_1$ and a thickness $T_1$; wherein the soot-generating device is allowed to move relative to the deposition supporting surface, and the velocity of the soot-generating device relative to the deposition supporting surface is modulated such that in at least half of the area of the layer of glass soot deposited, local soot density variation through the center half thickness is low. Preferably, the soot preform or soot particle layer deposited by using the process or apparatus of the present invention has, over a distance over 0.2 mm in the identified area, more preferably over 0.2 cm, an initial local soot density variation measured in a plane perpendicular to the intended optical axis of the sintered glass of less than 10% of the average bulk density of the soot preform, or less than 0.1 g/cm³, whichever is greater.

FIG. 1 schematically illustrates a soot preform 101 produced by using the process and/or the apparatus of the present invention. The soot preform 101 has an essentially cylindrical shape with a height of $T_1$ and a diameter of $D_1$. Upon sintering, the axis of the cylinder will be the intended optical axis of the glass piece. The whole soot preform is considered as a layer of soot particles for the convenience of discussion of the present invention. Of course, the whole deposited preform upon completion of deposition may comprise multiple layers of soot particles, and each layer has the required local soot density variation described supra. The center portion 103 inside the soot preform 101, with a height of $T_2$ and a diameter of $D_2$, has a low local soot density variation described above at least where $D_2^2 \leq 0.50 D_1^2$, and $T_2 \leq 0.50 T_1$. In certain preferred embodiments of the present invention, the center portion 103 inside the soot preform 101 has a low local soot density variation at least where $D_2^2 \leq 0.50 D_1^2$, and $T_2 \leq 0.75 T_1$. In certain preferred embodiments of the present invention, $D_2 \geq 5$ cm and $T_2 \geq 5$ mm. In certain other preferred embodiments of the present invention, $D_2 \geq 10$ cm and $T_2 \geq 5$ cm.

Figure 2:
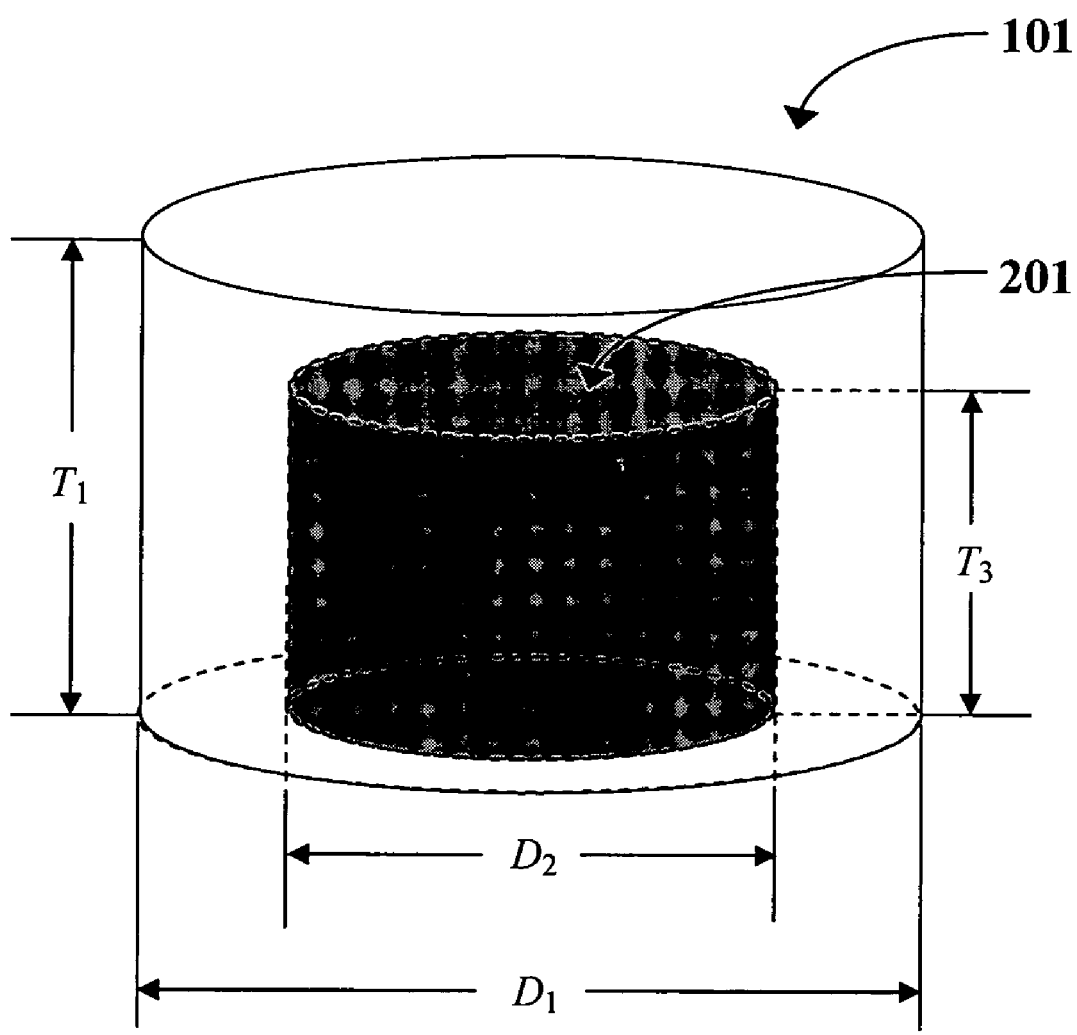
FIG. 2 is a schematic diagram illustrating a soot preform produced by using the process and apparatus of the present invention.

FIG. 2 is a schematic illustration of the soot preform of FIG. 1 with a different identified core portion 201. The core portion 201 differs from the center portion 103 in FIG. 1 in that the core portion 201 has a bottom that is part of the bottom of the whole soot preform 101, and has a height of $T_3$. In certain embodiments of the present invention, it is preferred that the core portion 201 has a low local soot density variation at least where $D_2^2 \leq 0.75 D_1^2$, and $T_3 \leq 0.90 T_1$. In certain preferred embodiments of the present invention, $D_2 \geq 5$ cm and $T_3 \geq 5$ mm. In certain other preferred embodiments of the present invention, $D_2 \geq 10$ cm and $T_3 \geq 5$ cm.

In order to obtain sintered silica glass with high homogeneity in composition and properties, it is highly desirable that the local soot density variation of the soot layer or soot preform deposited is low. It is highly desirable that the local soot density across the plane of the deposited soot essentially perpendicular to the intended optical axis of the sintered glass is essentially uniform, viz., the local soot density variation in such plane is low. To that end, it is desirable that the rate of soot generation from the soot-generating device remains essentially constant. For a burner, it means that it is desirable that the gas flow rates (Si-containing precursor compounds, $O_2$, fuel, and the like) supplied to the burner remain essentially constant during the soot-deposition step. However, it is not ruled out the feedstock ($O_2$, fuel and precursor compounds) flow rates are varied during the deposition process to impact the local soot density profile of the soot preform.

The present inventors have found that proper modulation of the motion, especially the velocity, of the soot-generating device relative to the soot deposition supporting surface can lead to the desired low local soot density variation in the deposited soot layer or preform. Such modulation can be achieved by adjusting the velocity of a moving supporting surface, the velocity of a moving soot-generating device, or both.

The planar deposition supporting surface of the deposition substrate in step (II) of the process of the present invention may be placed in various directions. For example, it can be horizontal (essentially orthogonal to the direction of gravity force exerted on the deposition substrate if the substrate has a cylindrical shape and the deposition surface is one of the bottom surfaces) or vertical (essentially parallel to the gravity force exerted on the deposition substrate if the substrate has a cylindrical shape and the deposition surface is one of the bottom surfaces) or slant (between horizontal and vertical). The deposition supporting surface may be placed facing upward (essentially opposite to the direction of the gravity force exerted on the deposition substrate if the deposition substrate is essentially cylindrical and the deposition surface is one of the bottom surfaces) or downward (essentially parallel to the direction of gravity force exerted on the deposition substrate if the deposition substrate is essentially cylindrical and the deposition surface is one of the bottom surfaces) or slant (between upward and downward). In a preferred embodiment of the present invention, the deposition supporting surface is horizontal and placed facing upward.

The modulation of the velocity of the soot-generating device can take the form of oscillation of the soot-generating device relative to the soot deposition supporting surface. If the soot-generating device is a single burner, it may oscillate about the rotation axis of the deposition substrate, to result in a desirable velocity pattern of the burner when it reaches various location of the soot deposition supporting surface. When modulating the velocity of the soot-generating device, the following factors should be taken into consideration: (i) the angular speed of the various points of the deposition supporting surface if the deposition substrate rotates; (ii) the oscillation speed of the burner; (iii) heat dissipation rate of the system at various location of the soot deposition surface; (iv) gas flow pattern at various location of the soot deposition surface and (v) burner feedstock ($O_2$, fuel, precursor compounds, and the like) flow rate, such that the desired local soot density variation can be achieved in the deposited soot preform. In a system consisting of a single burner linearly oscillating about the rotation axis of the deposition substrate, the quantity of the total velocity of the burner relative to the deposition supporting surface can be calculated as follows:

$$|v| = \sqrt{(\omega(r) \cdot r)^2 + (v_b(r))^2},$$

where $|v|$ is the quantity of the velocity of the burner relative to the deposition supporting surface, r is the radial distance from the rotation axis of a given location on the deposition supporting surface, $\omega(r)$ is the angular speed of the rotating deposition substrate relative to a common reference object (such as the earth) when the burner reaches a position having a distance r from the rotation axis, and $v_b(r)$ is the velocity of the burner relative to the common reference object at radial distance r. In a simplified ideal model of this system, wherein the heat dissipation rate and gas flow conditions are regarded as identical in the concerned locations of the soot preform, and the burner feedstock flow rate are held essentially constant, the modulation of the velocity of the burner relative to the deposition supporting surface should result in an essentially constant $|v|$ at differing r. If the angular speed of the rotating deposition substrate $\omega(r)$ remains constant, one needs to adjust the burner oscillation speed $v_b(r)$ order to reach this goal. Alternatively, one may adjust both the burner oscillation speed $v_b(r)$ and the deposition substrate angular speed $\omega(r)$ to obtain an essentially constant $|v|$.

It is highly desirable that in step (II) of the process of the present invention, during the soot deposition process, the deposition supporting surface is actively heated to a temperature between about 500-1000° C., in certain embodiments preferably between about 700-1000° C. If the temperature is too high, the soot particles deposited will start to sinter to form sintered glass, which can lead to high local soot density variation and is undesirable. If the temperature is too low, it will be difficult to deposit the soot on the deposition surface to form a stably shaped soot preform.

It is also highly desirable that in step (II) of the process of the present invention, during the soot deposition process, the deposition supporting surface has an essentially uniform temperature excluding areas directly in contact with the soot stream from the soot-generating device, in certain preferred embodiments a temperature variation of less than about 50° C., in certain embodiments less than about 25° C., in certain embodiments preferably less than about 15° C., in certain other embodiments preferably less than about 10° C. Such high temperature uniformity of the soot deposition supporting surface is conducive to the high local soot density of the preform.

It is desired that the average local soot density in the soot preform is between 0.1-1.6 g/cm$^3$, in certain embodiments preferably from 0.4-0.8 g/cm$^3$.

The process of the present invention may further comprise the following steps:

(III) optionally drying, purifying and/or doping the soot preform formed in step (II); and (IV) sintering at least part of the soot preform at a temperature over 1000° C. to obtain a sintered glass essentially free of bubbles.

If step (III) is carried out and a drying process is involved, it can be dried by using a halogen-containing compound, CO, $CO_2$, and compatible mixtures thereof. Such halogen-containing compound may be $F_2$, $Cl_2$, $Br_2$ or $C_aS_bX_c$, where X is halogen or combination of halogens, a, b and c are non-negative integers, and 4a+6b=c. If low-OH silica glass is desired, and the soot preform is produced by using flame hydrolysis in a $H_2O$-rich environment, it is often required the soot preform be dried prior to sintering thereof in step (IV). A preferred drying agent for the soot preform is $Cl_2$. After drying, the soot preform can have an OH level as low as less than 0.1 ppm by weight.

If step (III) is carried out and a purifying process is involved, it can be purified by treating the soot preform at an elevated temperature in a purifying atmosphere comprising a halogen-containing compound or compatible mixtures thereof. Such halogen-containing compound may be $F_2$, $Cl_2$, $Br_2$ or $C_aS_bX_c$, where X is halogen or combination of halogens, a, b and c are non-negative integers, and 4a+6b=c. A preferred purifying agent is $Cl_2$. Heat treatment in the presence of those purifying agents can strip the soot preform of unwanted metals, such as alkali metals, alkali earth metals, transition metals, and the like. Thus, the drying and purifying processes may be carried out simultaneously.

If step (III) is carried out, it may involve a doping process as well of the soot preform. In the doping process, the soot preform may be doped with OH, F, and other desired dopants to a desired level by heat treating the soot preform in the presence of a gas comprising such radicals. Thus, the purifying and doping processes may be carried out simultaneously.

It is usually desired that step (III), if carried out, is carried out at a temperature under the sintering temperature of the soot preform. Thus, desirably, step (III) is carried out at a temperature between about 700-1400° C. In certain embodiments, it is preferred that the doping temperature is between about 700-1000° C. It is desired that, at any given time during step (III), the soot preform has an average temperature $T_a$, and the temperature throughout the soot preform is essentially uniform, preferably maintained within $T_a\pm25°$ C., in certain embodiments preferably within $T_a\pm10°$ C., in certain other embodiments preferably within $T_a\pm5°$ C. High temperature uniformity in the soot preform during step (III) is required in certain preferred embodiments such that a uniform composition and property profile is obtained in the soot preform immediately after step (III).

In certain preferred embodiment of the present invention, during step (III), the soot preform is placed upon a supporting surface of an essentially uniformly heated supporting doping stage. More preferably, the supporting surface of the essentially uniformly heated supporting doping stage has an essentially uniform temperature, in certain embodiments a temperature variation of less than or equal to about 50° C., in certain embodiments preferably less than or equal to about 20° C., in certain other embodiments preferably less than or equal to about 10° C., in certain other embodiments preferably less than or equal to about 5° C.

In certain preferred embodiments of the present invention, in step (IV), the soot preform is allowed to sinter over a heated sintering substrate having a supporting sintering surface with an essentially uniform temperature on which the soot preform is placed, whereby the sintering of the soot preform is allowed to progress from the surface in contact with the supporting sintering surface to the other end. In certain preferred embodiments, in step (IV), at any given time, different areas of the sintering front progresses at an essentially uniform speed. In certain preferred embodiments, during step (IV), the sintering front progresses at an essentially constant speed. In certain preferred embodiments of the present invention, the deposition substrate and the sintering substrate are the same substrate. In those embodiments, it is preferred that the deposition substrate is made of high purity fused silica glass. In step (IV) of the process of the present invention, usually the supporting sintering surface is heated to a temperature between 1000-1500° C., whereby sintering is allowed to occur.

According to the present invention, it has been surprisingly found that step (IV) may be carried out in air. It has been known that sintering silica soot preforms in air in the prior art typically results in gas bubbles trapped in the sintered glass. The present invention, however, by allowing progressive sintering from the bottom to the top at essentially the same rate, solves the bubble-formation problem in the prior art. Gas previously existing in the soot preform can be allowed to dissipate during the sintering process according to the present invention.

It is preferred in certain embodiments, especially those in which the OH level in the sintered glass is desired to be controlled at a certain level, that step (IV) of the process of the present invention is carried out in an atmosphere in which the partial pressure of water and other OH-imparting compounds are controlled. For example, the atmosphere in which the sintering is carried out may be an admixture of He/$H_2O$, He/$O_2$/$H_2$, He/$O_2$/$H_2O$, and the like, in which the partial pressure of $H_2O$ is controlled at a desired level to result in a desired OH level in the sintered glass.

In certain preferred embodiments of the process of the present invention, step (IV) may be carried out in the presence in certain dopants, such as but not limited to F-containing compounds. Thus, steps (III) and (IV) may be carried out at least partly simultaneously.

It is also contemplated that steps (I), (II), (III) and (IV) may be carried out at least partially concurrently, i.e., soot deposition, doping and sintering may be carried out in the same equipment concurrently at the same time. Doping may be effected by dopants supplied to the soot-generating devices, such as burners, or introduced into the atmosphere in which the process steps are carried out via a separate inlet. In this case, the soot perform typically can have two zones simultaneously during certain time period: a sintered zone developing from the bottom of the soot preform in proximity to the soot deposition supporting surface, and a soot zone adjacent to the sintered zone, which is gradually converted into part of the sintered zone, while additional soot particles are deposited thereon.

One of the great advantages, inter alia, of the present invention, is the possibility of producing silica soot preform by using flame hydrolysis or other processes, doping, purifying the soot preform and sintering the soot preform in an environment essentially free of contaminating refractory materials, such as zircon bricks, $Al_2O_3$ bricks, $ZrO_2$ bricks, and the like. Traditional processes and apparatuses for making synthetic silica glasses, especially direct-to-glass and furnaces therefor, involve the use of refractory bricks and refractory baits in the construction of the furnace and the laydown process. These refractories, such as $ZrO_2$, zircon, $Al_2O_3$, and the like, are typically carefully and thoroughly purified by $Cl_2$, and the like, before use. Nonetheless, the purified refractories tend to contain a high level of metals, such as alkali, alkaline earth, transition metals, and the like. At the high temperatures under which the glass is formed, those contaminants are introduced into the glass. The contaminants are an important source for the problems of the finally sintered glass, such as lowered transmission, reduced laser damage resistance, and the like, when the glass is used for applications operating in the deep and vacuum UV regions. The present invention, by providing the possibility of producing the soot preforms and sintered glass in an environment essentially free of contaminating refractories, solves this problem, and thus can be used for producing high-purity-fused silica glass for use in UV lithographic devices at a high efficiency.

A second aspect of the present invention is an apparatus for making silica glass material from glass soot particles, comprising the following components:

(A) a soot deposition substrate having an essentially planar deposition supporting surface on which soot particles are to be deposited and capable of rotating about a rotation axis;

(B) a heating source having controllable heating power for heating the soot deposition substrate such that the deposition supporting surface has an essentially uniform temperature;

(C) a glass soot-generating device (i) capable of providing at least one stream of glass soot particles comprising silica and directing the stream of glass soot particles to the deposition supporting surface of the soot deposition substrate and (ii) movable horizontally and/or vertically relative to the deposition supporting surface of the soot deposition substrate; and (D) a system for controlling and driving the motion of the soot-generating device relative to the deposition supporting surface of the soot deposition substrate.

As mentioned supra in connection with the process of the present invention, the planar deposition supporting surface of the deposition substrate in step (II) of the process and the component (B) of the apparatus of the present invention may be placed in various directions. For example, it can be horizontal (essentially orthogonal to the direction of gravity force exerted on the deposition substrate if the substrate has a cylindrical shape and the deposition surface is one of the bottom surfaces) or vertical (essentially parallel to the gravity force exerted on the deposition substrate if the substrate has a cylindrical shape and the deposition surface is one of the bottom surfaces) or slant (between horizontal and vertical). The deposition supporting surface may be placed facing upward (essentially opposite to the direction of the gravity force exerted on the deposition substrate if the deposition substrate is essentially cylindrical and the deposition surface is one of the bottom surfaces) or downward (essentially parallel to the direction of the gravity force exerted on the deposition substrate if the deposition substrate is essentially cylindrical and the deposition surface is one of the bottom surfaces) or slant (between upward and downward). In a preferred embodiment of the present invention, the deposition supporting surface is horizontal and placed facing upward. However, it is also possible to place the deposition supporting surface downward. In this case, as mentioned infra, usually a vacuum chuck is needed in order to counter the gravity of soot preform formed on the deposition supporting surface.

The soot deposition substrate is typically made of high purity material that does not contaminate the soot preforms to be deposited thereon. For example, where high purity undoped fused silica is the glass to be made in the apparatus of the present invention, it is desirable that the soot deposition substrate is made of high purity fused silica glass having similar composition, especially in terms of levels of impurities, especially alkali metals. It is also possible that the soot deposition substrate is made of a material having a significantly different composition, as long as it does not contain elements that would migrate into the soot preform to be deposited thereon and impart negative effect to the properties of the glass to be produced.

The heating source can be an irradiation heater, such as an infrared heater, a resistive heater, an induction heater, a flame, a plasma torch, and the like. The configuration of the heat source should advantageously heat the deposition substrate evenly such that an essentially uniform temperature of the deposition supporting surface can be obtained. In certain preferred embodiments, the heating power of the heat source can be easily adjusted to suit the heating needs of the deposition, doping, drying, purifying and sintering steps of the process of the present invention. A heating source with essentially the same shape of the soot deposition substrate is usually better capable of heating the deposition substrate evenly, thus resulting in an essentially uniform temperature of the deposition supporting surface. In certain preferred embodiments of the apparatus of the present invention, component (B) (the heating source) is essentially planar. In certain preferred embodiments, component (B) is also capable of heating a sintering supporting substrate to a temperature to enable a glass soot preform consisting essentially of silica particles and/or dopant particles placed upon the sintering supporting substrate to sinter progressively. In these embodiments, it is further preferred that the sintering supporting substrate is the deposition substrate. The heating source may be stationary or movable relative to the soot deposition substrate. In a particularly advantageous embodiment, the heating source is rotatable about the rotation axis of the deposition substrate relative to the deposition substrate, thus enabling a more uniform heating of the deposition substrate.

A particularly advantageous heating source is an induction heater. The susceptor of the induction heater is the heating element that raises the temperature of the deposition substrate. The susceptor can be made to have an essentially planar shape. An advantage of induction heating is the capability of instantly adjusting the heating power, thus the temperature, of the susceptor. In a system where precise temperature control of a solid substrate is desired such as the apparatus of the present invention, induction heating is particularly advantageous. The susceptor can be made of any typical electrically conductive materials for susceptors in induction heating: graphite, platinum, molybdenum, and the like. To avoid oxidation of the susceptor material, or to avoid contamination of the soot deposition environment, purifying, doping or sintering environment, the susceptor may be covered or sealed with a clean material, such as a sheet of high purity fused silica glass.

As mentioned in connection with the process of the present invention above, the soot-generating device may comprise a burner, a plasma gun, or other soot gun. The soot-generating device is capable of producing soot that is an admixture of particles having different compositions, or particles with essentially the same composition at an elevated temperature. Thus the soot particles may be silica soot particles doped with various dopants, or a mixture of silica soot particles and dopant soot particles such as $TiO_2$, $Al_2O_3$, and the like. The soot-generating device may comprise different units capable of producing soot particles having essentially the same composition, or different units capable of producing soot particles having different compositions. For example, the soot-generating device may comprise a single or multiple burners producing silica soot particles with the same or differing compositions. For another example, the soot-generating device may comprise separate burners dedicated for producing silica soot particles and $TiO_2$ soot particles, respectively. It is also possible that the same burner may be used for producing silica soot particles and $TiO_2$ particles at different times during the deposition step.

The capability of the soot-generating device to move vertically and/or horizontally relative to the deposition supporting surface makes it possible to modulate the velocity of the soot-generating device relative to the deposition supporting surface. As mentioned supra, the modulation of the velocity of the soot-generating device relative to the soot deposition surface enables a low local soot density variation in the soot layer or soot preform deposited on the deposition supporting surface.

Component (D) of the apparatus of the present invention facilitates the modulation of the velocity of the soot-generating device relative to the soot deposition supporting surface. In certain preferred embodiments of the apparatus of the present invention, the component (D) comprises a computer capable of receiving and delivering information from and to the devices that control the motion of the soot-generating device. In certain preferred embodiments, the component (D) is capable of modulating the motion of the soot-generating device relative to the deposition supporting surface in a manner such that a layer of glass soot can be deposited on the deposition supporting surface to form soot preform comprising a layer of soot particles, wherein in at least half of the area of the layer of glass soot deposited, local soot density variation through the center half thickness is low. Preferably, the soot preform or soot particle layer deposited by using the process or apparatus of the present invention has, over a distance over 0.2 mm in the identified area, more preferably over 0.2 cm, an initial local soot density variation measured in a plane perpendicular to the intended optical axis of the sintered glass of less than 10% of the average bulk density of the soot preform, or less than 0.1 $g/cm^3$, whichever is greater. In certain preferred embodiments, the soot layer comprises a cylinder having a diameter of at least 5 cm and a height of at least 5 mm. In certain other embodiments, the soot layer comprises a cylinder having a diameter of at least 10 cm and a height of at least 5 cm.

A soot preform prepared by using the apparatus of the present invention, illustrated in FIGS. 1 and 2, is also described supra in connection with the process of the present invention.

In certain embodiments of the apparatus of the present invention, it further comprises an enclosure adapted for covering a glass soot preform to form a chamber, said enclosure optionally equipped with inlets through which gas can be introduced into the chamber. Advantageously, the enclosure is made of high purity fused silica glass.

In certain embodiments, the component (B) is placed upon a rotatable stage, and the component (B) and the rotatable stage are separated by a layer of refractory felt. The layer of refractory felt functions to prevent overheating the stage.

Figure 3:
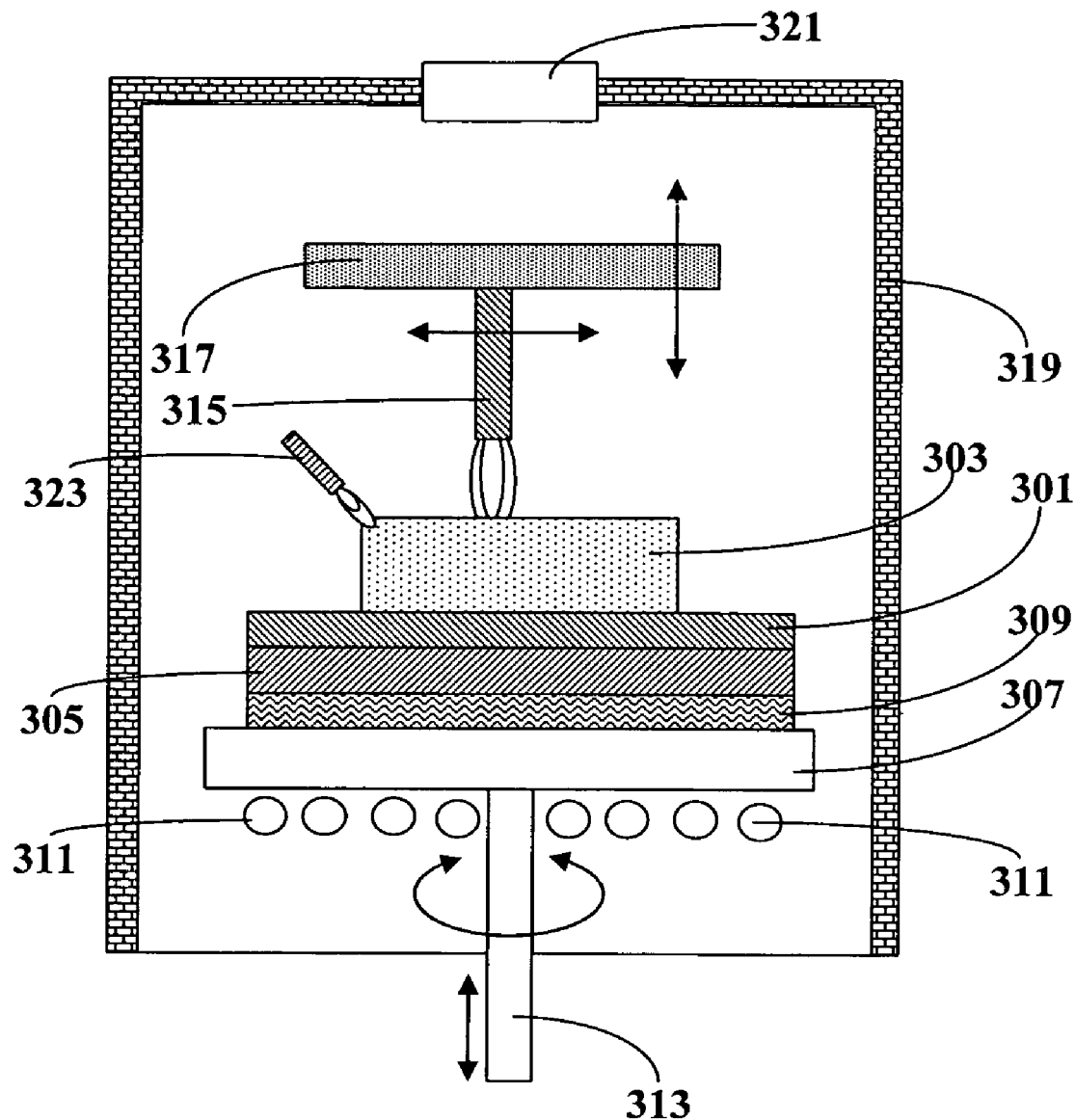
FIG. 3 is a schematic diagram illustrating the components of the apparatus of one of the embodiments of the present invention when operating in the soot deposition step.
Figure 4:
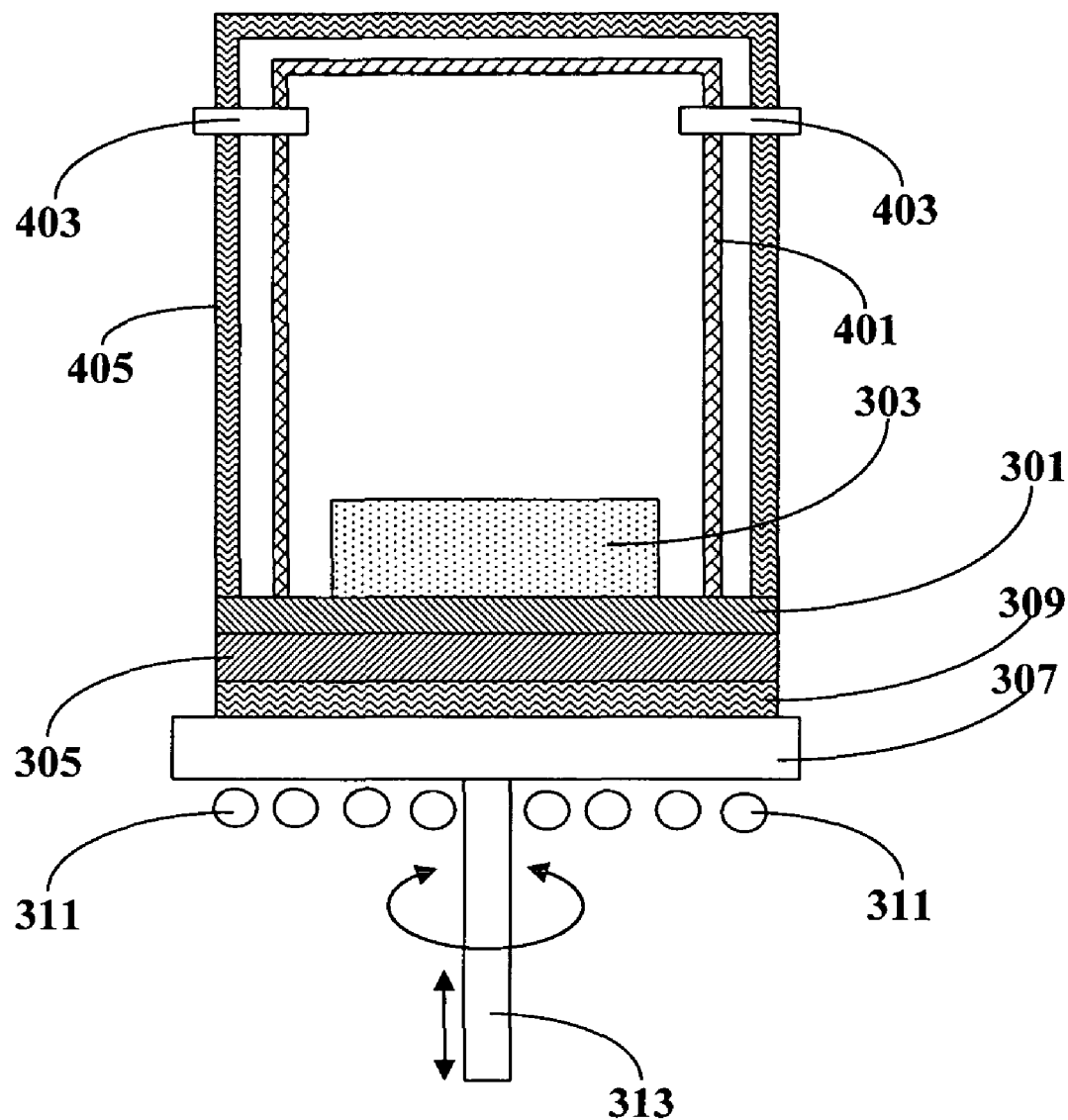
FIG. 4 is a schematic diagram illustrating the components of the apparatus of the embodiment of the present invention illustrated in FIG. 3 when operating in the purifying, doping, drying and/or sintering steps.

The apparatus of the present invention is further illustrated by certain embodiments detailed in FIGS. 3 and 4. FIG. 3 schematically illustrates the main components of an apparatus of the present invention in which a single burner 315 is being operated to deposit soot particles to form a soot preform 303 on the upper surface of a deposition substrate 301. The deposition substrate 301 is heated by the heating source 305 placed on the top surface of stage 307. Between the stage 307 and heating source 305, a layer of refractory felt of 309 is interposed. The heating element 305 is heated by induction coil 311 placed underneath the rotatable stage 307. A shaft 313 connected to the stage 307 can be driven to move the stage 307 clockwise, counter clockwise, and up and down. The burner 315, attached to fixture 317, can oscillate back and forth between the left and right. The fixture 317 may move up and down as well in order to maintain an essentially constant distance between the burner and the top surface of the soot preform. An optional enclosure 319 with gas inlets/outlets 321 is also illustrated to cover the burner setup and the soot preform. By using the heating source, the optional enclosure may be maintained at a very low temperature, thus eliminating the needs for furnace walls constructed of potentially contaminating refractories. The induction coil 311 may be held stationery relative to the stage 307, allowing it to uniformly heat the heat source 305. 323 as illustrated FIGS. 3 and 4 are optional edge burner(s), which raises the temperature of the edge portion of the soot preform in order to increase the density of the edge portion, thus avoiding cracking of the soot preform during the deposition and subsequent handling.

FIG. 4 shows the apparatus of FIG. 3 in operation during the purifying, drying, doping and/or sintering steps. In this figure, the enclosure 319 is omitted though it may still be present. In these steps, the soot preform may be held within an optional enclosure 401 having gas inlets/outlets 403 constructed of high purity materials that essentially does not contaminate the soot preform 303 during the operation. Where high purity fused silica glass for UV lithography is to be produced, the enclosure can be advantageously made of high purity fused silica glass. The atmosphere inside the enclosure, the composition and temperature thereof, can be effectively controlled at desired level in order to obtain the sintered glass with desired composition and properties. For example, during the purifying/drying stage, $Cl_2$ can be delivered into and evacuated from the enclosure 401 through the inlet/outlet 403. During the doping stage, dopants such as $H_2O$, F-containing gas, and the like, can be introduced into the enclosure 401 and maintained at desired levels. During the sintering step, the atmosphere in the enclosure 401 can be controlled as well. By adjusting the power supply to the induction coils, the temperature and heating rate of the heating source 305, thus the temperature of the supporting substrate 301, can be precisely controlled. Ambient heating 405 may be used as well in addition to the heating source 305. Sintering of the soot preform can be effected in a separate device as well.

By controlling the heating power of the induction coil over time, the temperature and temperature elevation rate of the supporting substrate 301 can be precisely controlled. In the sintering step where the soot preform is allowed to sinter into transparent glass, the temperature profile of the support substrate can be controlled such that the sintering advances progressively from the bottom of the soot preform in contact with the support substrate to the top. It is highly desirable, and is achievable by adjusting the heating power of the system, that the sintering advances at essentially the same rate at different area of the soot preform. As mentioned supra, by allowing the sintering to advance progressively from the bottom to the top, the sintering can be effected even in air without trapping air bubbles in the sintered glass.

Figure 5:
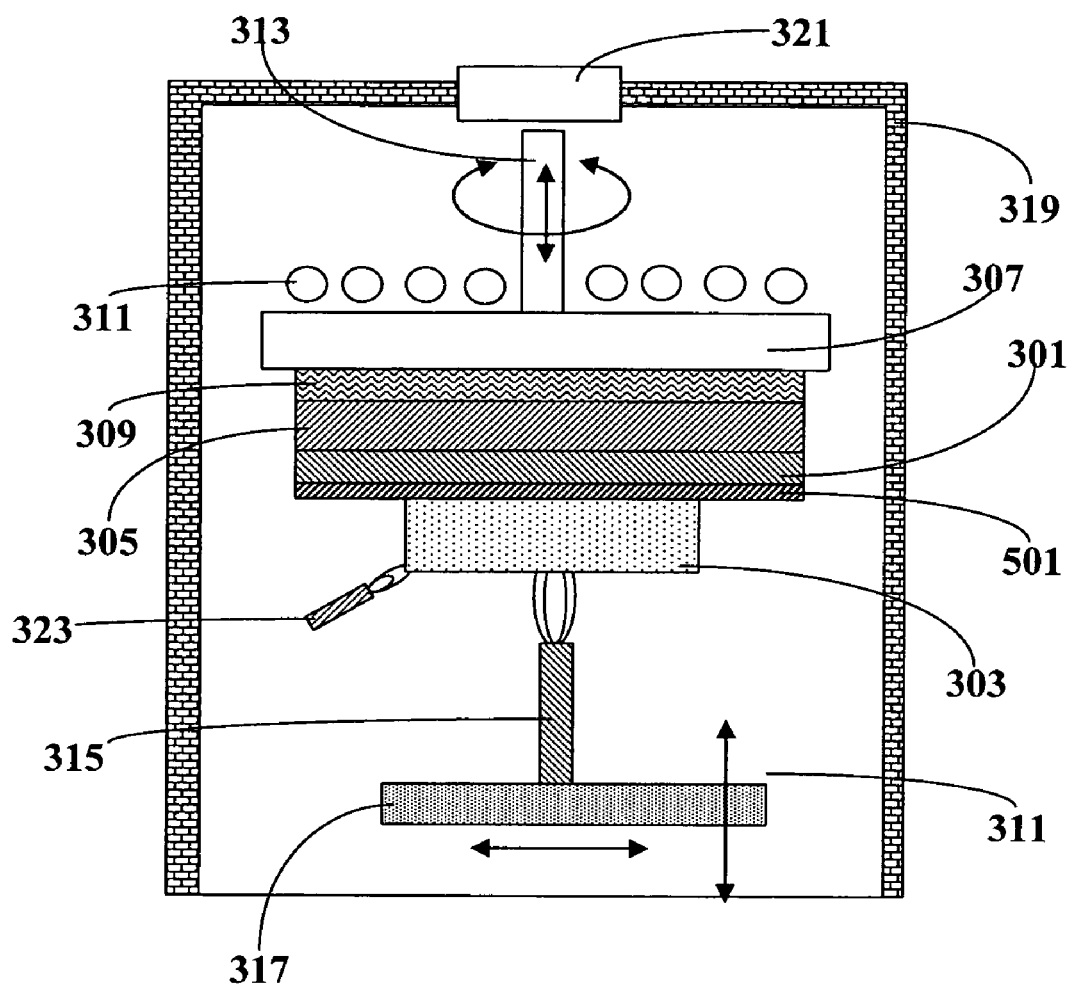
FIG. 5 is a schematic diagram illustrating the components of the apparatus of another embodiment of the present invention when operating in the soot deposition step.

FIG. 5 illustrates the apparatus setup of another embodiment of the present invention. In this embodiment, soot deposition supporting substrate 301 is placed to face downward, and the burner flame of the burner 315 is allowed to extend upward. In this embodiment, in order to hold the soot preform in place without falling, a vacuum chuck 501 is used. Edge burner 323 is also illustrated.

Figure 6:
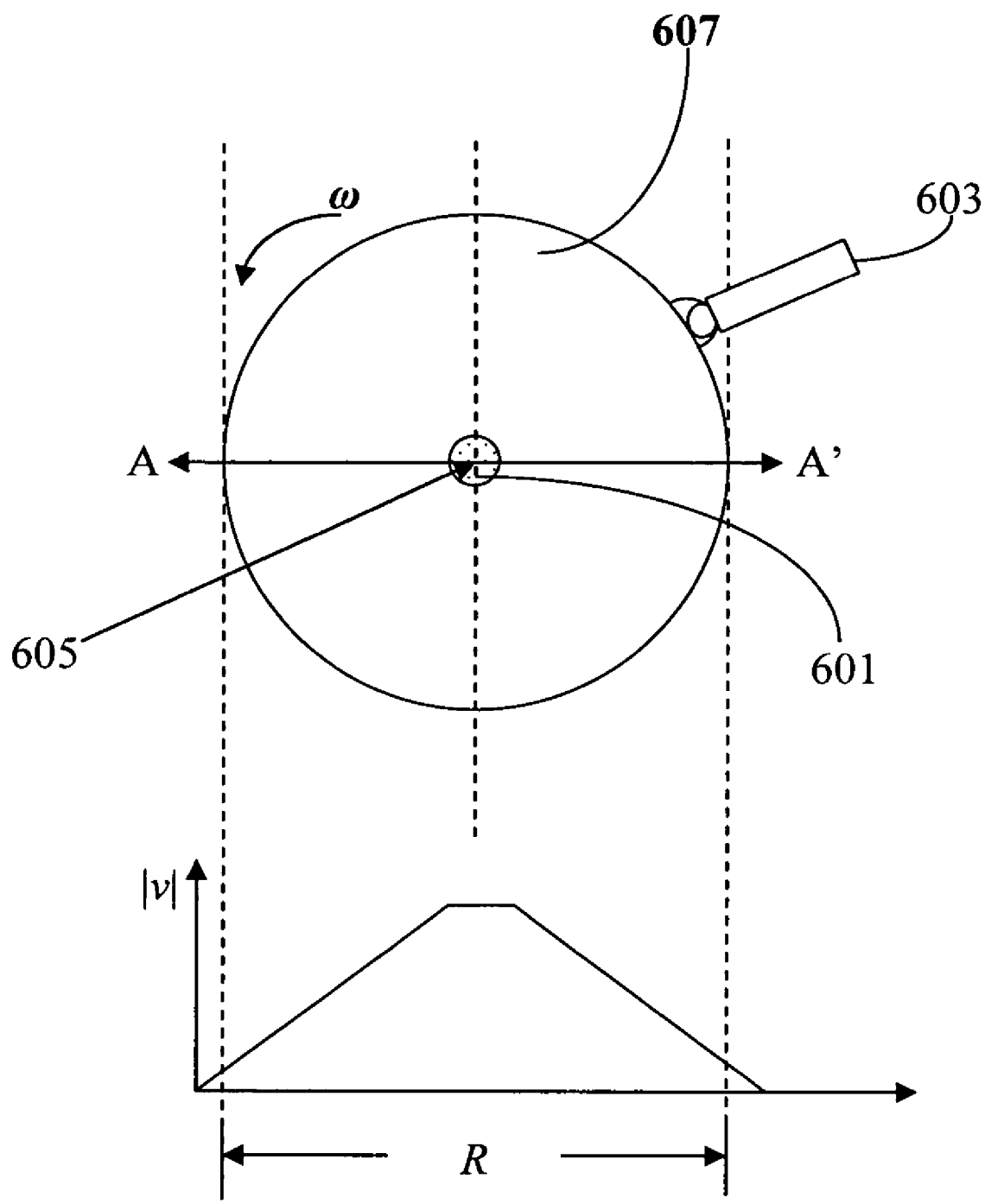
FIG. 6 is a schematic diagram illustrating the movement of a burner relative in one embodiment of the present invention.

FIG. 6 shows schematically the top plan view of a burner 601 oscillating back and forth along the diameter AA' of the targeted soot preform 607 (the big circle) having a diameter R. The soot preform 607 rotates about its center 605. The velocity profile of burner 605 in one embodiment is illustrated in the bottom portion of FIG. 6.

Figure 7:
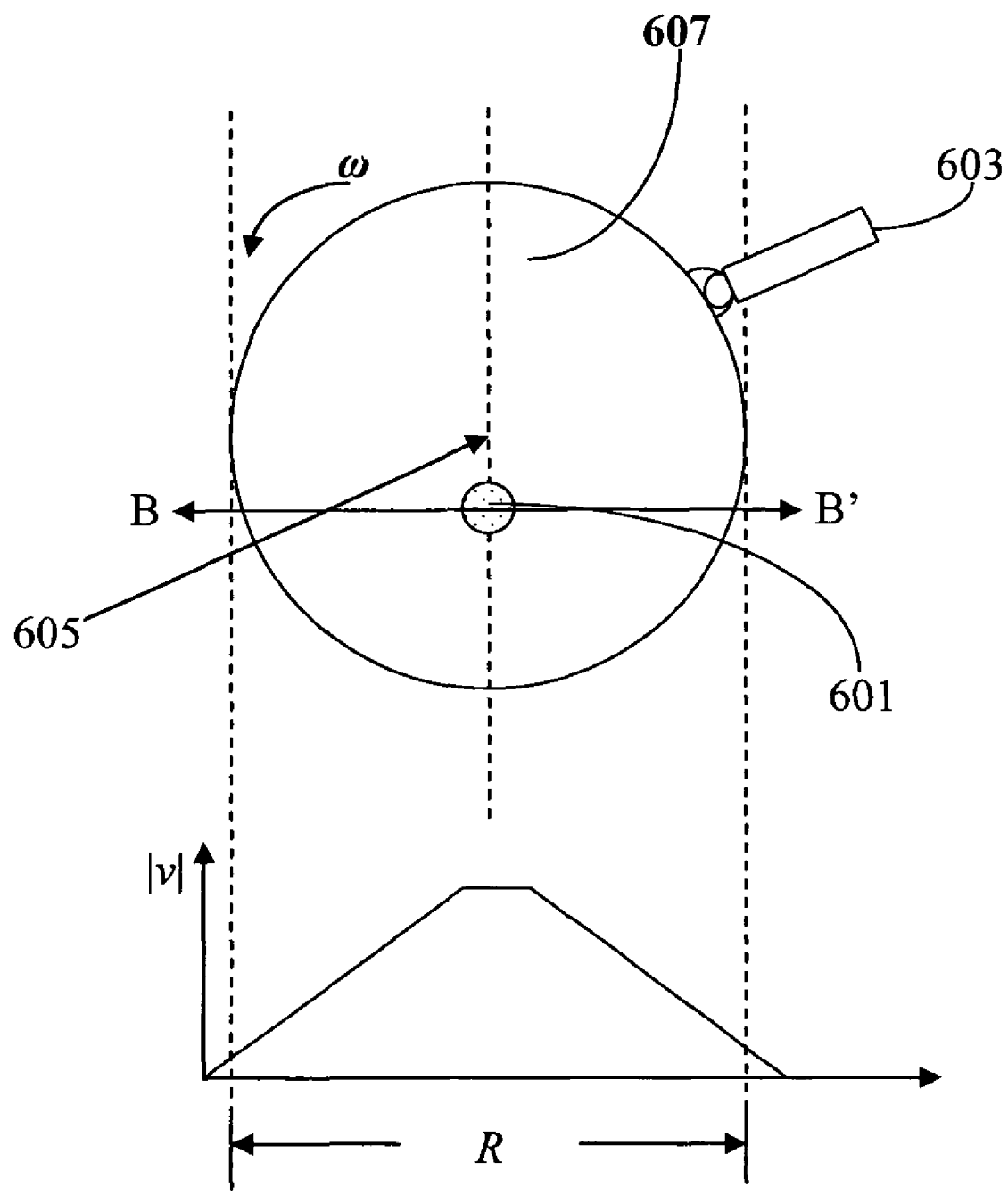
FIG. 7 is a schematic diagram illustrating the movement of a burner in another embodiment of the present invention.

FIG. 7 shows schematically the top plan view of a burner 601 oscillating back and forth along a straight line BB' of the targeted soot preform 607 having a diameter R. BB' is parallel to one of the diameters of the targeted soot preform but does not pass through the center 605. This type of burner oscillation is believed to produce soot preform with low local soot density variation due to avoidance of passing through the center where the angular speed is zero. Velocity profile of the burner is also shown at the bottom portion of this figure.

Figure 8:
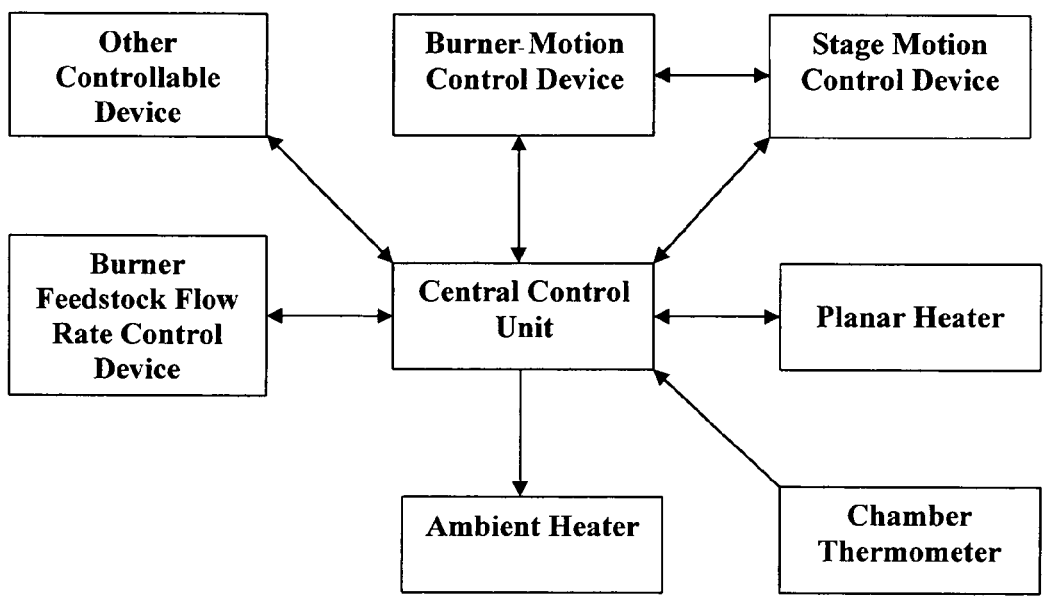
FIG. 8 is a block diagram illustrating the components of the apparatus of another embodiment of the present invention.

The apparatus of the present invention may be controlled by a central control unit, such as a personal computer. The block diagram of FIG. 8 schematically illustrates the main components of an embodiment of the apparatus of the present invention. In this embodiment, a central control unit communicates, in one-way or two-way, with the burner motion control device, stage motion control device, burner feedstock flow rate control device, the planar heater, the chamber thermometer, the ambient heater and other controllable devices. Thus the central control unit can modulate the motion of the burner relative to the support substrates, the flow rate of burner feedstocks, heating rates of the planar heater and the ambient heater, and the like, according to a pre-loaded program and in response to signals collected from those devices and thermometers and other sensors. Meanwhile, those individual components, such as the stage motion control device and the burner motion control device may communicate with each other with or without the involvement of the central control unit.

EXAMPLE

Figure 9:
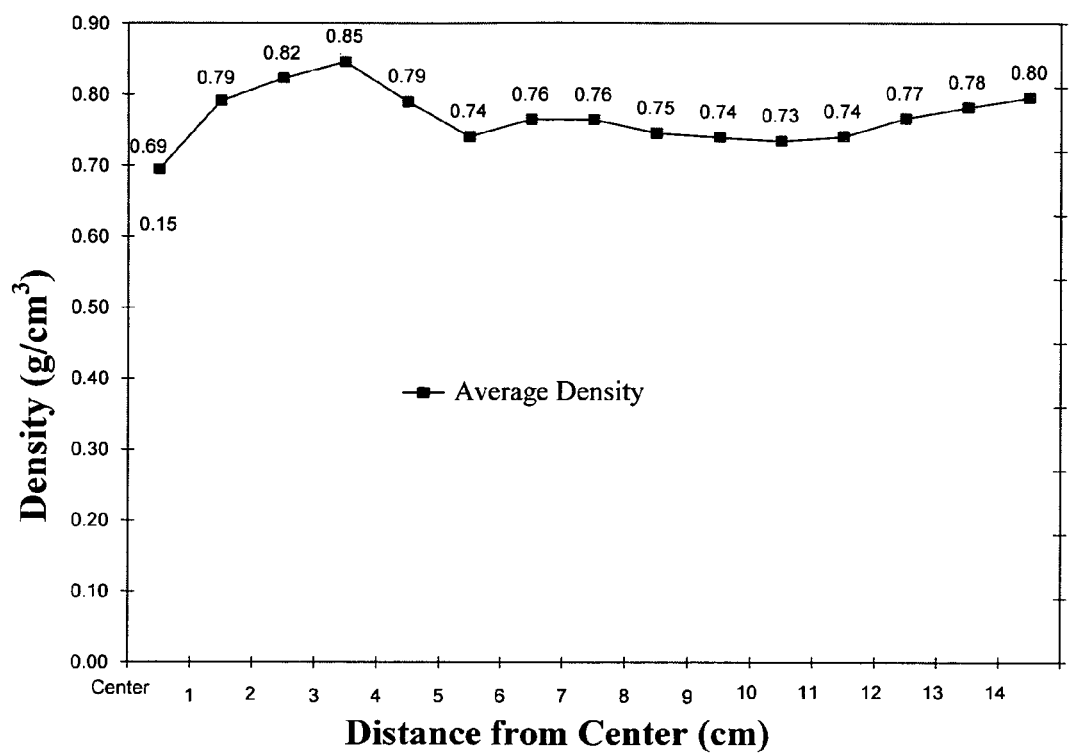
FIG. 9 is a diagram showing the average local soot density of a soot preform prepared using the process and apparatus of the present invention as a function of distance from the center of the preform.

In this example, a silica soot preform was deposited in an apparatus schematically illustrated in FIG. 3. The induction heated heat source 305 was heated to about 700° C. before the soot deposition started. Heat source 305 was a graphite susceptor. The soot deposition substrate 301 is an about 6 mm (¼") thick, 300 mm diameter high purity fused silica plate. The single burner 315 was allowed to oscillate linearly across the center of the deposition substrate 301. Feedstock to the burner included OMCTS, $O_2$, and fuel. The silica soot generated in the flame was allowed to deposit on the upper surface of the deposition substrate 301 to form a soot preform. During the deposition, the stage 307, thus the heat source 305 and the deposition substrate 301, as well as the soot preform 303, rotate about the shaft 313. The burner was allowed to move up and down in order to maintain an essentially constant distance between the burner and the depositions substrate of about 7 inches (about 18 cm). The deposited, essentially cylindrical soot preform 303 was taken off the deposition substrate 301 and local soot density thereof was measured. The average local soot density profile throughout the height of the essentially cylindrical soot preform as a function of radial distance (distance from the center of the soot preform) is presented in FIG. 9.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for making doped or undoped silica glass material, comprising the following steps:
    (I) providing at least one stream of glass soot particles comprising silica via a soot-generating device; and
    (II) directing the at least one stream of glass soot particles to an essentially planar deposition supporting surface of a deposition substrate rotatable about a rotation axis, such that at least one layer of glass soot is deposited on the deposition supporting surface to form a soot preform, said layer having an area $A_1$ and a thickness $T_1$;
    wherein in step (II), the deposition supporting surface has an essentially uniform temperature such that the temperature of the deposition support surface is within ±25° C. of an average temperature and wherein the deposition supporting surface is heated to a temperature of between 500° C. and 1000° C. by an active heating source adjacent to a side of the substrate opposite the deposition supporting surface and having controllable heating power, wherein the active heating source is a planar susceptor of an induction heating system and has a surface that forms a flat plane free of an opening or aperture and is adjacent to the side of the deposition support surface, wherein a layer of refractory felt is disposed between the substrate and the active heating component, and wherein the soot-generating device is allowed to move relative to the deposition supporting surface, and the velocity of the soot-generating device relative to the deposition supporting surface is modulated such that in at least half of the area of the layer of glass soot deposited and through at least the center half thickness, local soot density variation is low.

2. A process in accordance with claim 1, wherein in step (II), the velocity of the soot-generating device relative to the deposition supporting surface is modulated such that in at least half of the area of the layer of glass soot deposited and through at least the center half thickness, the soot preform exhibits a high OH concentration uniformity.

3. A process in accordance with claim 1, wherein in step (II), the velocity of the soot-generating device relative to the deposition supporting surface is modulated such that in at least 75% of the area of the layer of glass soot deposited, local soot density variation through 90% of the thickness from the bottom in proximity to the deposition supporting surface is low.

4. A process in accordance with claim 1, wherein the deposition supporting surface of the deposition substrate is essentially horizontal, and the rotation axis of the deposition substrate is essentially vertical.

5. A process in accordance with claim 1, wherein the deposition supporting surface of the deposition substrate faces upward.

6. A process in accordance with claim 1, wherein the deposition supporting surface of the deposition substrate faces downward.

7. A process in accordance with claim 1, wherein the soot-generating device is a single burner.

8. A process in accordance with claim 7, wherein the single burner is allowed to oscillate relative to the deposition supporting surface across the rotation axis.

9. A process in accordance with claim 1, wherein the soot-generating device is allowed to oscillate relative to the deposition supporting surface without crossing the rotation axis.

10. A process in accordance with claim 9, wherein the oscillation of the soot-generating device relative to the deposition supporting surface is essentially linear.

11. A process in accordance with claim 1, wherein the soot-generating device comprises a burner array.

12. A process in accordance with claim 1, wherein the deposition supporting surface has an essentially uniform temperature excluding areas directly in contact with the soot stream from the soot-generating device.

13. A process in accordance with claim 1, wherein the average local soot density in the soot preform is between 0.1-1.6 g/cm$^3$.

14. A process in accordance with claim 1, further comprising the following steps:
(III) optionally drying, purifying and/or doping the soot preform formed in step (II); and
(IV) sintering at least part of the soot preform at a temperature over 1000° C. to obtain a sintered glass essentially free of bubbles.

15. A process in accordance with claim 14, wherein step (III) is carried out in which the soot preform is doped in an atmosphere comprising dopants, and the soot preform is maintained between about 700° C. and 1400° C.

16. A process in accordance with claim 14, wherein at any given time during step (III), the soot preform has an average temperature $T_a$, and the temperature throughout the soot preform is essentially uniform.

17. A process in accordance with claim 15, wherein during step (III), the soot preform is placed upon a supporting surface of an essentially uniformly actively heated supporting doping stage.

18. A process in accordance with claim 17, wherein the supporting surface of the essentially uniformly heated supporting doping stage has an essentially uniform temperature.

19. A process in accordance with claim 14, wherein in step (IV), the soot preform is allowed to sinter over a heated sintering substrate having a supporting sintering surface with an essentially uniform temperature upon which the soot preform is placed, whereby the sintering of the soot preform is allowed to progress from the surface in contact with the supporting sintering surface to the other end.

20. A process in accordance with claim 19, wherein in step (IV), at any given time, different areas of the sintering front progresses at an essentially uniform speed.

21. A process in accordance with claim 19, wherein during step (IV), the sintering front progresses at an essentially constant speed.

22. A process in accordance with claim 14, wherein the deposition substrate and the sintering substrate are the same substrate.

23. A process in accordance with claim 22, wherein the deposition substrate is made of high purity fused silica glass.

24. A process in accordance with claim 14, wherein the supporting sintering surface is actively heated to a temperature between 1000-1500° C., whereby sintering is allowed to occur.

25. A process in accordance with claim 14, wherein at any given time, the supporting sintering surface has an essentially uniform temperature.

26. A process in accordance with claim 14, wherein at any given time during step (IV), the soot preform has an average temperature $T_b$, and the temperature throughout the soot preform is maintained within $T_b \pm 25°$ C.

27. A process in accordance with claim 14, wherein step (IV) is carried out in air.

28. A process in accordance with claim 14, wherein step (IV) is carried out in an atmosphere the partial pressure of water and/or other OH-imparting compounds in which is controlled, so that the OH concentration in the sintered glass is controlled.

29. A process in accordance with claim 14, wherein step (IV) is carried out in the presence of dopants.

30. A process in accordance with claim 14, wherein steps (III) and (IV) are both carried out, and are carried out at least partly concurrently.

31. A process in accordance with claim 14, wherein steps (I), (II), (III) and (IV) are carried out at least partly concurrently.

32. A process in accordance with claim 14, wherein contaminating refractories are not used.

33. A process for making doped or undoped silica glass material, comprising the following steps:
(I) providing at least one stream of glass soot particles comprising silica via a soot-generating device; and
(II) directing the at least one stream of glass soot particles to an essentially planar deposition supporting surface of a deposition substrate rotatable about a rotation axis, such that at least one layer of glass soot is deposited on the deposition supporting surface to form a soot preform, said layer comprising a cylinder having a diameter of at least 5 cm and a height of at least 5 mm;
wherein in step (II), the deposition supporting surface has an essentially uniform temperature such that the temperature of the deposition support surface is within ±25° C. of an average temperature of between about 500-1000° C., and wherein the deposition supporting surface is heated by an active heating source located adjacent to a side of the deposition substrate opposite the deposition supporting surface and having controllable heating power, wherein a layer of refractory felt is disposed between the substrate and the active heating component, and wherein the active heating source is a planar susceptor of an induction heating system and has a surface that forms a flat plane free of an opening or aperture and is adjacent to the side of the deposition support surface, and wherein the soot-generating device is allowed to move relative to the deposition supporting surface, and the velocity of the soot-generating device relative to the deposition supporting surface is modulated such that in the identified cylinder, local soot density variation measured in a plane parallel to the bottom surface of the cylinder is low.

34. A process in accordance with claim 33, wherein the identified cylinder having a low local soot density variation has a diameter of at least 10 cm.

35. A process in accordance with claim 33, wherein in step (II), the velocity of the soot-generating device relative to the deposition supporting surface is modulated such that in the identified cylinder, the soot preform exhibits a high OH concentration uniformity.

36. A process in accordance with claim 1, further comprising heating an edge portion of the soot preform with at least one edge burner.

37. An apparatus for making silica glass material from glass soot particles, comprising the following components:
  (A) a soot deposition substrate having an essentially planar deposition supporting surface on which soot particles are to be deposited and capable of rotating about a rotation axis;
  (B) an active heating source located adjacent to a side of the substrate opposite the deposition support surface and having controllable heating power for heating the soot deposition substrate such that the deposition supporting surface has an essentially uniform temperature, further comprising a layer of refractory felt disposed between the substrate and the active heating component, wherein the temperature of the deposition support surface at different locations is within ±25° C. of an average temperature of between about 500-1000° C., wherein the active heating source is a planar susceptor of an induction heating system, and wherein the active heating source has a surface that forms a flat plane free of an opening or aperture and is adjacent to the side of the deposition support surface;
  (C) a glass soot-generating device located adjacent to the deposition support surface of the substrate, wherein the glass soot-generating device is (i) capable of providing at least one stream of glass soot particles and directing the stream of glass soot particles to the deposition supporting surface of the soot deposition substrate and (ii) movable horizontally and/or vertically relative to the deposition supporting surface of the soot deposition substrate; and
  (D) a system for controlling and driving the motion of the soot-generating device relative to the deposition supporting surface of the soot deposition substrate.

38. An apparatus according to claim 37, wherein the planar deposition supporting surface of component (A) is placed essentially horizontally, and the rotation axis of the soot deposition substrate is essentially vertical.

39. An apparatus according to claim 37, which is essentially free of contaminating refractories in area exposed to atmosphere in which soot deposition takes place.

40. An apparatus according to claim 37, wherein the component (D) is adapted for modulating the velocity of the soot-generating device relative to the deposition supporting surface of the soot deposition substrate such that a layer of glass soot can be deposited on the deposition supporting surface to form a soot preform comprising a layer of soot particles, said layer of glass comprising a cylinder having a diameter of at least 5 cm and a height of at least 5 mm, wherein in the identified cylinder, local soot density variation measured in a plane parallel to the bottom surface of the cylinder is low.

41. An apparatus according to claim 40, wherein the component (D) is adapted for modulating the velocity of the soot-generating device relative to the deposition supporting surface of the soot deposition substrate such that at least one layer of glass soot can be deposited on the deposition supporting surface, wherein in at least 75% of the area of the at least one layer of glass soot deposited, local soot density variation through 90% of the thickness from the bottom in proximity to the deposition supporting surface is low.

42. An apparatus according to claim 37, wherein the planar susceptor is made of graphite.

43. An apparatus according to claim 37, wherein the component (C) comprises a burner.

44. An apparatus according to claim 37, wherein the component (C) comprises multiple burners.

45. An apparatus according to claim 37, wherein at least one burner provides dopant soot particles, and at least one burner provides silica soot particles.

46. An apparatus according to claim 45, wherein at least one burner provides $TiO_2$ soot particles.

47. An apparatus according to claim 37, wherein the component (C) is a single burner capable of oscillating across the rotation axis of the deposition supporting surface.

48. An apparatus in accordance with claim 37, wherein the soot-generating device is capable of oscillating over the deposition supporting surface without crossing the rotation axis.

49. An apparatus in accordance with claim 48, wherein the oscillation of the soot-generating device relative to the deposition supporting surface is essentially linear.

50. An apparatus according to claim 37, wherein the component (B) is adapted for heating a sintering supporting substrate to a temperature to enable a glass soot preform consisting essentially of silica particles and/or dopant particles placed upon a sintering supporting substrate to sinter progressively.

51. An apparatus according to claim 50, wherein the sintering supporting substrate is the deposition substrate.

52. An apparatus according to claim 37, further comprising an enclosure adapted for covering a glass soot preform to form a chamber, said enclosure optionally equipped with inlets through which gas can be introduced into the chamber.

53. An apparatus according to claim 52, wherein the enclosure is made of high purity fused silica glass.

54. An apparatus according to claim 37, wherein the soot deposition substrate is made of high purity fused silica glass.

55. An apparatus according to claim 37, wherein the component (B) is rotatable about an essentially vertical rotation axis of the deposition substrate.

56. An apparatus according to claim 37, further comprising a rotatable stage upon which the active heating component (B) is placed.

57. An apparatus according to claim 56, further comprising, between the rotatable stage and the active heating component (B), a layer of refractive felt.

58. An apparatus according to claim 37, further comprising the following component:
  (E) a control unit in communication with the components (A), (B), (C) and (D), adapted for collecting operation information of components (A), (B), (C) and (D), and adjusting the parameters thereof accordingly where needed in order to obtain a predetermined soot deposition, doping and/or sintering condition.

59. An apparatus according to claim 37, further comprising at least one edge burner.

* * * * *